United States Patent [19]

Nakamura et al.

[11] Patent Number: 4,944,079
[45] Date of Patent: Jul. 31, 1990

[54] MACHINE FOR CONNECTING AN END OF AN OPTICAL FIBER CABLE TO AN OPTICAL FIBER CONNECTOR

[75] Inventors: Kunio Nakamura, Tokyo; Minoru Abe, Kawasaki, both of Japan

[73] Assignee: AMP Incorporated, Harrisburg, Pa.

[21] Appl. No.: 160,214

[22] Filed: Feb. 25, 1988

[30] Foreign Application Priority Data

Mar. 5, 1987 [JP] Japan .................. 62-51178

[51] Int. Cl.⁵ .......................................... H01R 43/00
[52] U.S. Cl. ................................. 29/33 M; 29/564.1; 29/564.8; 51/283 R
[58] Field of Search ............... 29/33 M, 564.1, 564.4, 29/564.6, 564.8, 857, 861, 748, 753; 225/2, 96.5; 81/9.51; 350/96.2, 96.22; 51/283 R

[56] References Cited

U.S. PATENT DOCUMENTS

| | | | |
|---|---|---|---|
| 4,046,298 | 9/1977 | Schroeder, Jr. ................... | 225/2 |
| 4,087,908 | 5/1978 | Fusco et al. ...................... | 29/753 |
| 4,361,942 | 12/1982 | Mazzola et al. ................. | 29/33 M |
| 4,384,431 | 5/1983 | Jackson ........................... | 51/283 R |
| 4,464,817 | 8/1984 | Johnson, Jr. et al. ........... | 29/33 M |
| 4,561,155 | 12/1985 | Randar et al. .................. | 29/33 M |
| 4,581,796 | 4/1986 | Fukuda et al. .................. | 29/748 |
| 4,601,093 | 7/1986 | Cope ............................... | 81/9.51 |
| 4,621,754 | 11/1986 | Long et al. ...................... | 225/2 |
| 4,643,520 | 2/1987 | Margolin ......................... | 350/96.2 |
| 4,744,775 | 5/1988 | Pauza .............................. | 439/607 |

OTHER PUBLICATIONS

AMP, "Optimate Fiber Optic Interconnection System", Catalog 83–718m, Issued 3–85.

Primary Examiner—Bruce Y. Arnold
Assistant Examiner—R. D. Shafer
Attorney, Agent, or Firm—Bruce J. Wolstoncroft; Adrian J. LaRue

[57] ABSTRACT

A machine for connecting an end of an optical fiber cable (1) to an optical fiber connector (2) comprises a stripping mechanism (10) that strips an end of a jacket (1b) from an end of the optical fiber cable (1) to expose an end of a fiber core (1a), a connector-connecting mechanism (30) which inserts the stripped end of the optical fiber cable (1) into a hole (2a) in the optical fiber connector (2) and connects the cable (1) with the connector (2), a core-cutting mechanism (60) which cuts the length of the fiber core (1a) protruding from the front end of the connector (2) leaving a tiny length of protruding fiber core (1a), and a core-finishing mechanism (70) which finishes the end surface of the protruding tiny length of fiber core (1a).

8 Claims, 9 Drawing Sheets

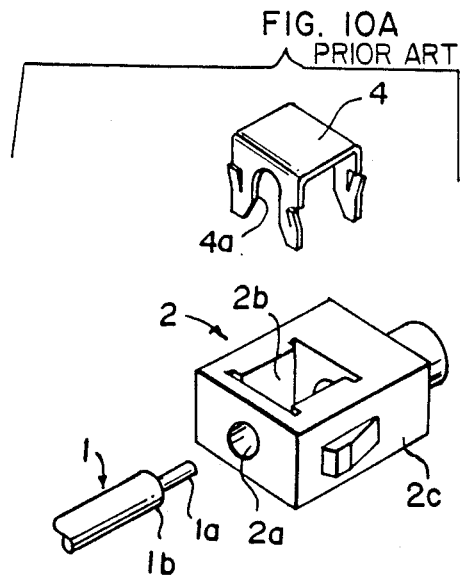
FIG. 10A PRIOR ART
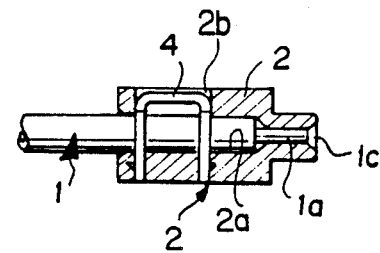
FIG. 10B PRIOR ART
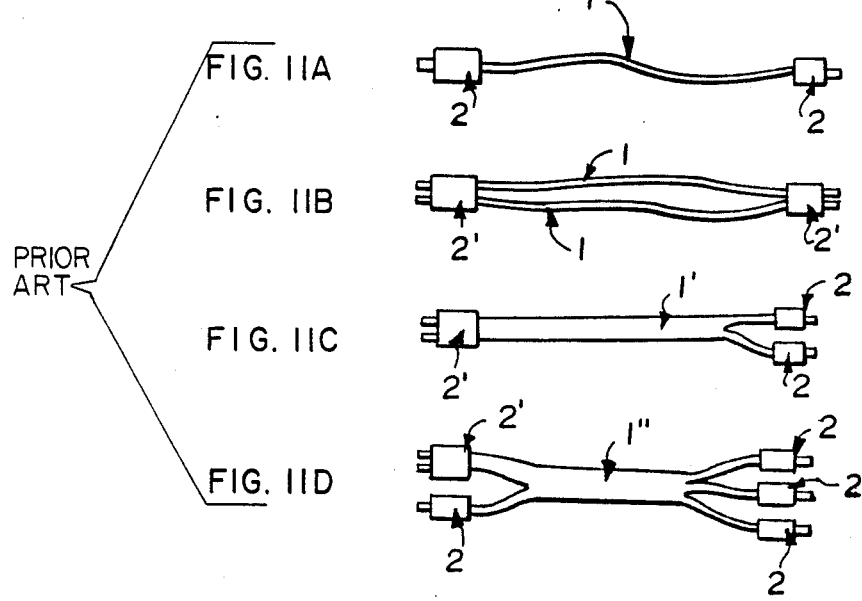
FIG. 11A
FIG. 11B
FIG. 11C
FIG. 11D
PRIOR ART

MACHINE FOR CONNECTING AN END OF AN OPTICAL FIBER CABLE TO AN OPTICAL FIBER CONNECTOR

FIELD OF THE INVENTION

This invention relates to a machine for connecting an end of an optical fiber cable to an optical fiber connector; more specifically, it relates to a machine which can connect a plurality of optical fiber cables to optical fiber connectors.

BACKGROUND OF THE INVENTION

Optical fiber cables for optical signal transmission are composed of a fiber core formed of optical glass, plastic, or material having optical transmission characteristics, and a jacket which covers the outer surface of the fiber core. It is used in various fields such as optical communications and other electronic equipment. When using such optical fiber cable to transmit an optical signal, it is necessary to enable reception of the optical signal by connecting an end of the optical fiber cable to a signal-receiving device or to another optical fiber cable end spaced from the first end. Various optical fiber connectors have been proposed to make this connection. An example is the connector disclosed in U.S. patent application Ser. No. 80,516 filed July 27, 1987. This connector, as shown in FIGS. 8 and 9, is connected to the end of the optical fiber cable 1; FIG. 8 shows connector 2 connected to one cable, and FIG. 9 shows connector 2' connected to two cables. Both connectors are inserted and connected to respective mating connectors 3, 3', which are mounted on a circuit board 5. The end surface of fiber core 1a opposes opto-electronic element 3a which receives the optical signal from or transmits the optical signal to fiber core 1a.

As is shown in FIG. 10A, the connector 2, shown in FIG. 8, has a retainer insertion opening 2b in housing 2c for insertion of the retainer 4 which retains cable 1 in hole 2a. As shown in FIG. 10B, the end of optical fiber cable 1 with an end of fiber core 1a exposed is inserted in hole 2a; retainer 4, partly inserted in retainer insertion opening 2b, is completely inserted into opening 2b and the edges of U-shaped slots 4a of retainer 4 bite into jacket 1b thereby causing cable 1 to be secured to housing 2a of connector 2.

Various types of cable assemblies are shown in FIGS. 11A through 11D. Both ends of a single cable 1, as shown in FIG. 11A, are respectively connected to a single cable connector 2. Both ends of two cables 1 are connected to a double connector 2' as shown in FIG. 11B. As shown in FIG. 11C, both ends of cable 1' with two fiber cores are connected to two single cable connectors 2 and one double cable connector 2'. FIG. 11D shows a cable 1' with three fiber cores connected to single cable connectors 2 at one end and to a single and a double cable connector 2, 2' at the other end.

As described above, when manufacturing an optical fiber cable assembly which connects one, two or more optical fiber connectors to the ends of an optical fiber cable or cables, the connection of the cable ends to the connectors was made in the past by stripping off a portion of the jacket from the optical fiber cable ends to expose the fiber cores, then connecting the cable ends to the connectors. As long as such connections have to be made individually, however, operational efficiency does not improve. A machine which can perform the aforementioned operations automatically has been sought. In particular, a machine has been sought which, as shown in FIGS. 11B through 11D, can automatically connect ends of a plurality of optical fiber cables to connectors or a plurality of connectors to the ends of an optical fiber cable.

SUMMARY OF THE INVENTION

The present invention automatically and continuously connects optical fiber cable ends to optical fiber connectors. The optical fiber cable end-processing machine for this purpose includes a stripping mechanism to hold the end of an optical fiber cable and strip off its jacket to expose a prescribed length of fiber core. After this, a connector-connecting mechanism is used to insert the end of the optical fiber cable into a hole in a housing of the connector whereafter a retaining member is moved into engagement with the cable so that the end of the optical fiber cable is secured within the connector. A core-cutting mechanism then cuts off the optical fiber core that protrudes beyond a front end of the housing leaving only a tiny length of protruding fiber core, and a core surface-finishing mechanism is then applied to the tiny length of protruding fiber core thereby heating and finishing the surface thereof.

When a fiber cable end is fed into the aforementioned machine, the jacket on the cable end is automatically stripped by the stripping mechanism, and the cable end is inserted and connected to a connector by the connector-connecting mechanism, after which cutting and end surface finishing of the fiber core which protrudes from the front end of the connector housing are performed. These operations are carried out automatically and continuously.

BRIEF DESCRIPTION OF THE DRAWINGS

The invention, together with objects and advantages thereof, is best understood by way of example with reference to the following detailed description in conjunction with the accompanying drawings.

FIGS. 10A and 10B are a perspective exploded view and a cros-sectional view of the connector and cable connection thereto.

FIGS. 11A through 11D are views showing examples of optical fiber cables to which optical fiber connectors are connected at both ends forming optical fiber cable assemblies.

DETAILED DESCRIPTION OF THE INVENTION

Figure 1:
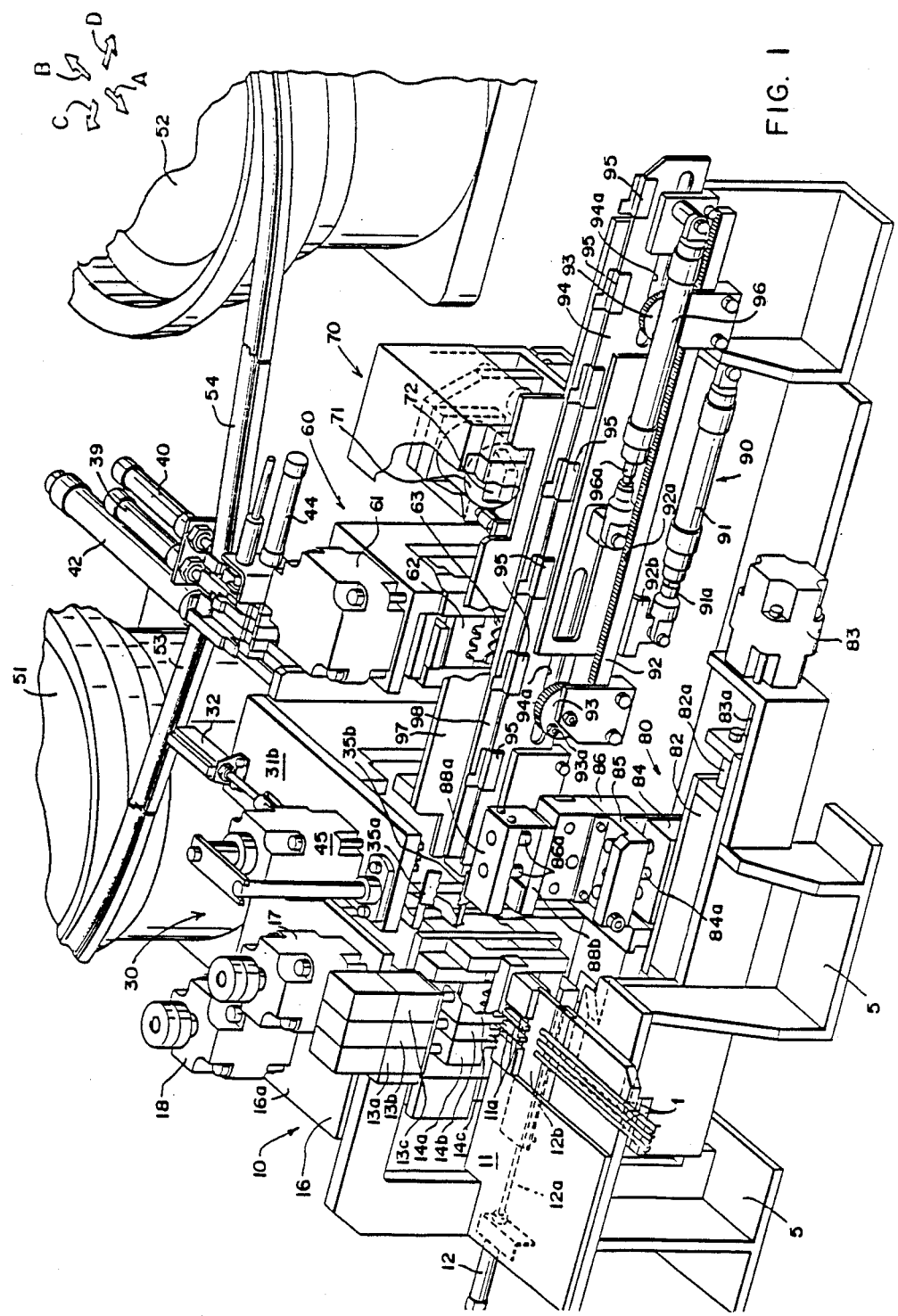
FIG. 1 is a perspective view showing the entire optical fiber cable end processing machine of the invention.

FIG. 1 illustrates an example of the optical fiber cable end-processing machine of the invention, which is mounted on a base 5 and includes a stripping mechanism 10 which holds an end of an optical fiber cable inserted therein and strips the jacket from the end so as to expose a prescribed length of fiber core; a connector-connecting mechanism 30 which inserts the end of the optical fiber cable whose fiber core is exposed into a hole of a connector housing and connects the cable end thereto; a core-cutting mechanism 60 which cuts the fiber core that protrudes beyond a front end of the housing; a core end surface-finising mechanism 70 which engages the front surface of the cut fiber core, heats it, and finishes the front surface thereof, a first conveyor mechanism 80 which conveys the cable whose jacket has been stripped by stripping mechanism 10 to connector-connecting mechanism 30, and a second conveyor mechanism 90 which conveys the cable from the connector-connecting mechanism 30 through the core-cutting mechanism 60 and to the core-finishing mechanism 70.

In FIG. 1, the explanation hereafter will be simplified by refering to the direction of arrow A as forward, the direction of arrow B as backward, the direction of arrow C as left and the direction of arrow D as right.

Stripping mechanism 10 has a table 11 affixed on base 5. Guide channels 11a, which extend from front to back, are located at the right rear of table 11. Movable plate 12b is positioned in front of these guide channels 11a. Plate 12b can move left and right with respect to table 11 through the reciprocation of shaft 12a of plate drive cylinder 12. Clamps 14a, 14b, 14c are located above guide channels 11a and are connected, respectively, to the shafts of clamp cylinders 13a, 13b, and 13c. In back of table 11, clamp cylinders 13a, 13b, 13c and clamps 14a, 14b, 14c, the stripping mechanism 10 which strips the jackets from the ends of optical fiber cables 1 and expose the fiber core is located.

Figure 2:
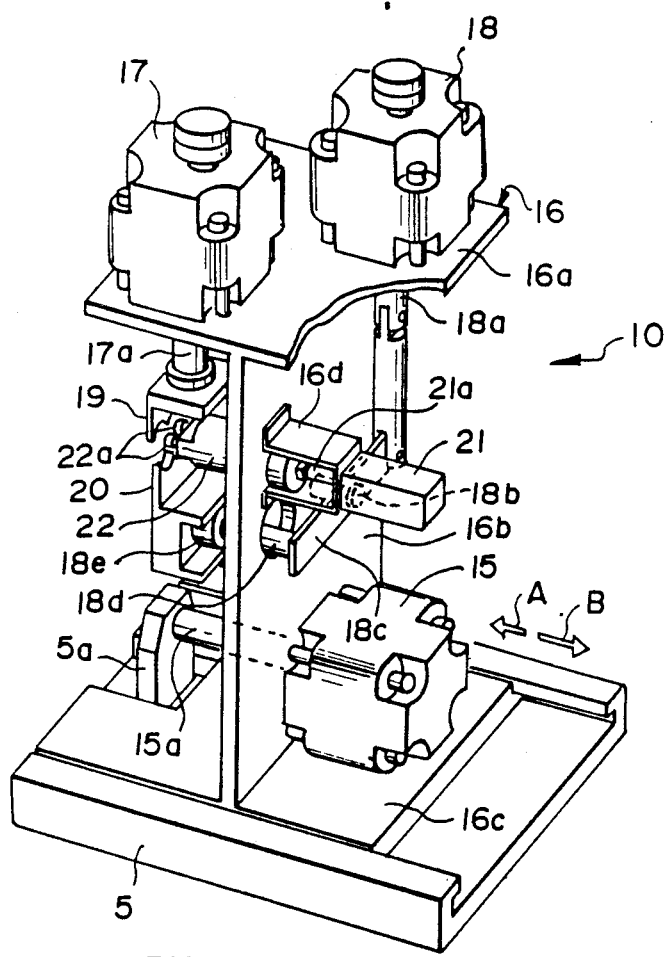
FIG. 2 is a perspective view showing a portion of the stripping mechanism of the machine.

FIG. 2 shows the stripping mechanism 10 as seen from the right rear of the machine which has a support base 16 that is constructed of horizontal plates 16a, 16c and vertical plate 16b mounted so as to move frontward and backward in the direction of arrows A and B on base 5. The shaft 15a of the cylinder 15 attached to support base 16 is connected to the projection 5a which is connected to base 5. Thus, the support base 16 moves back and forth with the reciprocal movement of shaft 15a as a result of the operation of cylinder 15. Two cylinders 17 and 18 are attached to the upper surface of the horizontal plate 16a with shafts 17a and 18a thereof extending downward. Upper blade 19 is attached to shaft 17a while shaft 18a is pivotally connected to one end of lever 18c, which pivots freely on the support axle 18b affixed to vertical plate 16b. Roller 18e is attached to the other end of lever 18c via arm 18d, and roller 18e engages lower blade 20. Therefore, when shafts 17a and 18a move downwardly under the action of cylinders 17 and 18, upper blade 19 is lowered, and lower blade 20 is raised via lever 18c, arm 18d, and roller 18a. A sensor cylinder 21 is also attached via bracket 16d to vertical plate 16b, and a touch-type sensor 22 is connected to the shaft 21a of the piston in cylinder 21 in such a way that it can freely move back and forth. Three sensor probes 22a are located on the front surface of touch-type sensor 22.

Figure 7A:
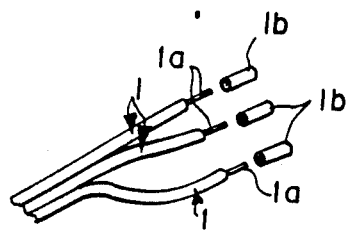
FIGS. 7A through 7D are perspective views showing the optical fiber cable and connectors processed by the optical fiber cable end processing machine.

The operation of the stripping mechanism constructed in the above manner will now be described. First, three optical fiber cables 1 are placed on table 11 so that their ends extend into guide channels 11a. The ends of cables 1 are moved so that they contact probes 22a on touch sensor 22. When probes 22a detect this contact, touch sensor 22 activates clamp cylinders 13a, 13b, and 13c thereby lowering clamps 14a, 14b, and 14c and clamping the ends of cables 1 in guide channels 11a. Blade cylinders 17 and 18 are then activated, cutting jackets 1b at a position of prescribed length from the ends of lowering and raising, respectively, upper and lower blades 19 and 20. After this, support cylinder 15 is activated, and upper and lower blades 19 and 20 move in the direction of arrow B so that the cut ends of the jackets 1b are removed as shown in FIG. 7A.

Optical fiber cables 1, with their jackets 1b stripped and fiber cores 1a exposed at the ends, are now conveyed to the connector-connecting mechanism 30 by first conveyor mechanism 80. First conveyor mechanism 80 has a conveyor cylinder 82 attached to base 5 so that it can move freely left and right; the shaft 82a of conveyor cylinder 82 is connected to shaft 83a on second conveyor cylinder 83. Therefore, the reciprocal movement of the pistons in conveyor cylinders 82 and 83 causes shafts 82a and 83 and therefore conveyor cylinder 82 to move left and right. Up-down cylinder 84 is affixed to conveyor cylinder 82, and up-down cylinder 86 is also connected to the end of shaft 84a, which extends out of cylinder 84 and is connected to support plate 85. Lower clamp plate 88b is affixed to the top of up-down cylinder 86, which has shafts 86a. Clamp plate 88a is connected to the ends of shafts 86a, which extend through lower clamp plate 88b and above it.

For optical fiber cables 1 to be conveyed from stripping mechanism 10 to connector-connecting mechanism 30 by conveyor mechanism 80, shaft 12a is first moved left by cylinder 12 in stripping mechanism 10 thereby moving plate 12b leftward. Next, up-down cylinder 84 is activated, lowering support plate 85, and, with upper and lower clamp plates 88a and 88b in an open position, the up-down position of this opening is matched to that of plate 12b, which has been moved left as described above. Next, shafts 82a and 83a of conveyor cylinders 82 and 83 are moved to the left, and upper and lower clamp plates 88a and 88b are positiond so that they clamp optical fiber cables 1 therebetween because of the space left by the movement of plate 12b leftward. Shafts 86a of up-down cylinder 86 are then contracted, and optical fiber cables 1 are clamped by upper and lower clamp plates 88a and 88b. After this, the clamping of cables 1 by clamps 14a, 14b, and 14c is released, while at the same time up-down cylinder 84 is activated and cables 1 are raised as a result of being clamped by upper and lower clamp plates 88a and 88b. These cables are removed from guide channels 11a, after which shafts 82a and 83a of conveyor cylinders 82 and 83 are contracted, and cables 1 are conveyed to a position where their ends face the connector-connecting mechanism 30.

Figure 3:
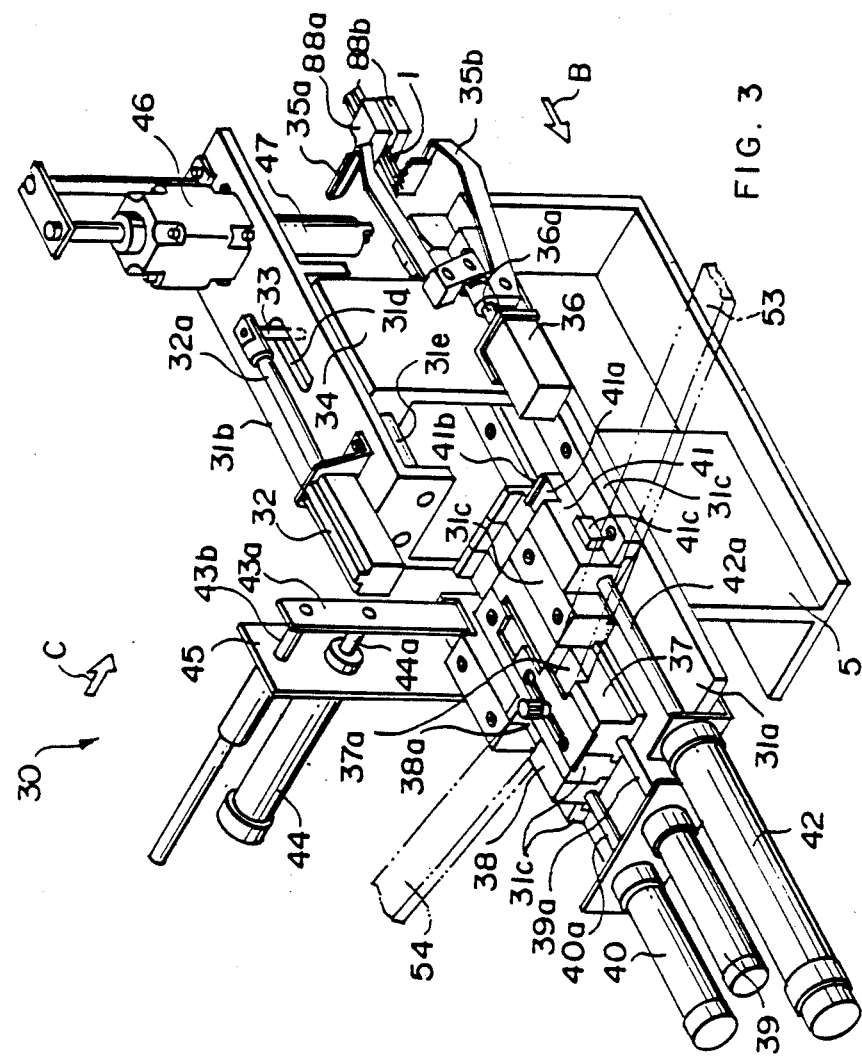
FIG. 3 is a perspective view showing the connector-connecting mechanism of the machine.

Connector-connecting mechanism 30 causes the ends of optical fiber cables 1, conveyed as explained above, to be connected with the two connectors fed from parts feeders 51 and 52 via feeder rails or channels 53 and 54. FIG. 3 shows this connector-connecting mechanism 30 as seen from the lower left side and FIGS. 1 and 3 are referred to for describing connector-connecting mechanism 30.

Flat plate 31a is affixed to base 5. Plate 31a has fixed thereto a plurality of guides 31c. Guided by these guides 31c, the two connector-retaining blocks 37 and 38 and insertion block 41 are mounted on top of plate 31a so that they freely move back and forth. Blocks 37, 38, and 41 are connected, respectively, to shafts 39a, 40a and 42a of block cylinders 39, 40, 42 affixed to plate 31a. Blocks 37, 38, and 41 move back and forth on plate 31a by the reciprocal operation of shafts 39a, 40a, and 42a.

Connector-retaining blocks 37 and 38 receive the connectors supplied via channels 53 and 54, respectively, and have connector-retaining slots 37a and 38a. Insertion block 41 has a slot 41a and a projection 41b which mates with the channels 2c, 2c' (FIGS. 4, 5) in the bottom surfaces of the connectors. A vertically-standing plate 45 is affixed to base 5 adjacent the front ends of blocks 37, 38 and 41; a connector-moving cylinder 44 with a shaft 44a which moves in the direction of arrow C is mounted to vertical plate 45. Plate 43a, guided so that it freely moves left and right by guide rod 43a, is attached to the end of shaft 44a.

Plate 31b is affixed to base 5 in a position which is higher than that of plate 31a. Plate-moving cylinder 32 is mounted on plate 31b and shaft 32a of cylinder 32 is connected via rod 33 to plate 34 through an oblong slot 31d in plate 31b. Plate 34 is positioned so that it moves freely back and forth on top of plate 31a underneath plate 31b along rods 31e via shaft 32a and rod 33.

Retainer-driving cylinder 46 is mounted on plate 31b, and its shaft projects through the bottom side thereof. A retainer-driving stuffer 47 is connected to the shaft of cylinder 46. Meanwhile, a clamp cylinder 36 is fixed to the side of moving block 34; upper and lower clamps 35a, 35b are pivotally mounted adjacent the front of cylinder 36a and open and close freely. The shaft 36a of cylinder 36 is connected to clamps 35a, 35b, and they are caused to open and close with the reciprocal movement of shaft 36a.

The operation of the connector-connecting mechanism 30 will now be described. First, optical fiber cables 1, which are clamped and conveyed by upper and lower clamp plates 88a, 88b in conveyor mechanism 80, are positioned in front of clamps 35a, 35b, as shown in FIG. 3, and are then positioned therebetween. At this point, clamp cylinder 36 operates, and shaft 36a causes clamps 35a, 35b to close so that the ends of optical fiber cables 1 are loosely held by the notches of clamps 35a, 35b which are located along opposed edges of the clamp. The shaft 32a of plate-moving cylinder 32 is now contracted so that plate 34 moves backward. At this point, optical fiber cables 1 are only loosely held by the notches in the edges of clamps 35a, 35b, so that cables 1, clamped between clamp plates 88a, 88b, are disposed between the opposed notches.

Figure 4A:
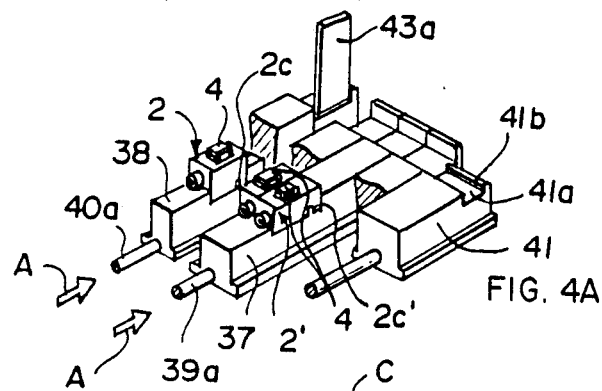
FIGS. 4A through 4C are perspective views showing the operation of the connector-holding members and cable insertion members of the machine.
Figure 4B:
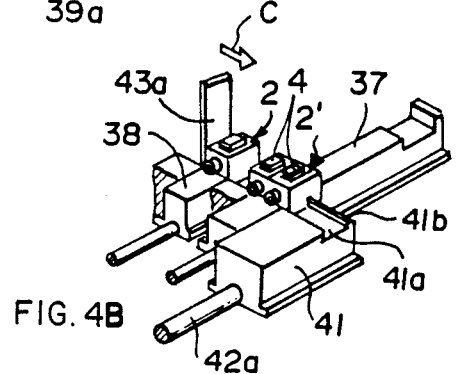
Figure 4C:
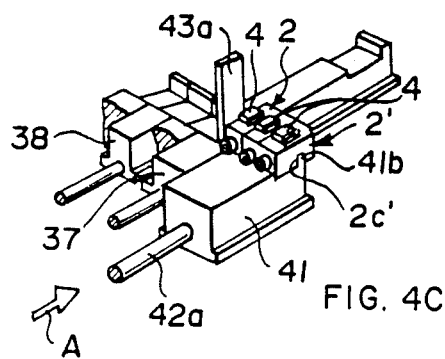

Meanwhile, connectors 2, 2' fed from parts feeders 51, 52 via feeder channels 53 and 54 are held one at a time in the recesses 37a, 38a in connector-holding blocks 37, 38. FIG. 4A shows this condition whereby connector 2' is held in the recess 37a in block 37, and connector 2 is held in the recess 38a in block 38. Retainers 4 are partly inserted in the openings in the upper part of the housings of connectors 2, 2'. Next, the shafts 39a, 40a of holding-block cylinders 39, 40 are extended and the connector-holding blocks 37, 38 are moved forward in the direction of arrow A, as shown in FIG. 4B. The connectors 2, 2' held in recesses 37a, 38a are positioned lengthwise along the slot 41a in connector-insertion block 41. Shaft 44a of connector-moving cylinder 44 is extended at this time thereby moving plate 43a in the direction of arrow C, and the connectors 2, 2' are pushed by the lower edge of plate 43a and moved into the slot 41a in insertion block 41. Channels 2c, 2c' are located in the bottom surface of the housings of connectors 2, 2' as shown in FIGS. 4 and 5. Channels 2c, 2c' mate with projection 41b on block 41 when connectors 2, 2' are moved into slot 41a and such arrangement holds connectors 2, 2' in position on block 41. FIG. 4C shows the connectors 2, 2' held in place in slot 41a along projection 41b. In this condition, shaft 42a of insertion block cylinder 42 extends and moves block 41 forward in the direction of arrow A.

Figure 7B:
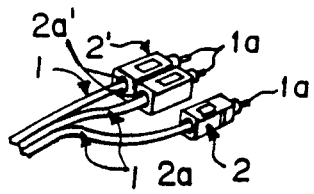
Figure 7C:
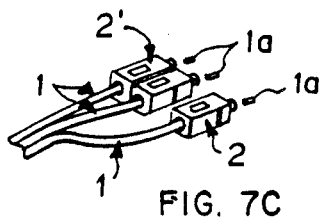

When insertion block 41 is moved forward, it moves toward optical fiber cables 1, clamped between clamp plates 88a, 88b still holding connectors 2, 2' thereon. At this point, the projection 41c located on the side of insertion block 41 contacts plate 34 thereby overcoming the pushing force of plate-moving cylinder 32 and causing plate 34 to move forward. This causes clamps 35a, 35b to move forward, and the ends of cables 1, which are loosely held by clamps 35a, 35b are inserted into the cable insertion holes 2a, 2a' in the housings of connectors 2, 2', which also have been moved forward. After this stuffer 47 is lowered by retainer-driving cylinder 46 thereby driving the retainers 4 into their seated positions in the openings in the housings of connectors 2, 2' which secures the cables in position in the connectors. As shown in FIG. 7B, the ends of optical fiber cables 1 inserted in cable insertion holes 2a, 2a' are thus connected to connectors 2, 2'. At this point, the ends of fiber cores 1a, which are exposed at the end of optical fiber cables 1, project outward beyond the front ends of connectors 2, 2'.

After the ends of optical fiber cables 1 are connected to connectors 2, 2' by the connector-connecting mechanism 30 in the above-described manner, the connectors with cables 1 are conveyed to the right by conveyor mechanism 90. Conveyor mechanism 90 comprises up-down moving cylinder 91 and left-right moving cylinder 96. Up-down moving cylinder 91 is connected to base 5, and its shaft 91a is connected to rack 92 via connecting plate 92b. The teeth 92a on rack 92 mesh with spaced gears 93 which are mounted to base 5 so as to rotate freely thereon. Gears 93 each have rollers (not shown) positioned eccentrically with respect to the axis of gear rotation. These rollers are disposed in respective elongated slots 94a which extend left and right in conveyor plate 94. Shaft 91a in up-down moving cylinder 91 is thus extended and contracted thereby moving rack 92 left and right, whereupon gears 93 are rotated and conveyor plate 94 is raised and lowered by the eccentric rollers. Also, left-right moving cylinder 96 is connected to base 5 while its shaft 96a is connected to conveyor plate 94 thereby causing shaft 96a to extend and contract which causes the conveyor plates 94 to move left and right.

Conveyor plate 94 is positioned so that it extends left and right and stands vertically in front of connector-connecting mechanism 30, core-cutting mechanism 60 and core end surface-finishing mechanism 70. A plurality of conveyor pawls 95 is attached with equal spacing to the upper edge of conveyor plate 94. Furthermore, upper and lower conveyor guide plates 97, 98 are fixed to the back side of conveyor plate 94 so as to oppose one another in spaced relationship. Conveyor plate 94 is moved by up-down and left-right moving cylinders 91 and 96, and the up-down, left-right movement of conveyor pawls 95 which accompanies this causes connectors 2, 2', along with optical fiber cables 1 connected thereto, to be moved from left to right within the prescribed space between conveyor guide plates 97, 98. This movement is illustrated in FIGS. 5A, 5B.

Figure 5A:
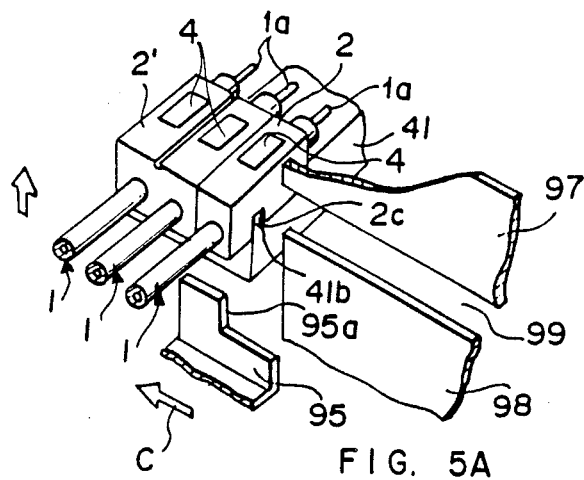
FIGS. 5A and 5B are perspective views which show the operation of the conveyor mechanism.
Figure 5B:
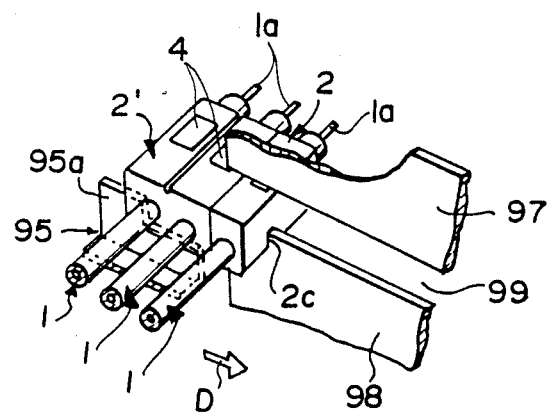

First, as shown in FIG. 5A, conveyor pawl 95 is lowered along with conveyor plate 94, it is then moved to the left in the direction of arrow C past the bottom of connectors 2, 2', which are held in slot 41a of insertion block 41. Conveyor pawl 95 is then raised and, as shown in FIG. 5B, the projection 95a on conveyor pawl 95 engages connectors 2, 2'. In this state, conveyor pawl 95 is moved to the right in the direction of arrow D. Connectors 2 and 2' are moved to the right by pawl 95, and the channels 2c, 2c' in the bottom surface of connectors 2, 2' mate with the top edge of lower conveyor guide plate 98. At the same time, the connectors 2, 2' are clamped within the space 99 which extends left and right between upper and lower conveyor guide plates 97 and 98, and, held in this way, are moved to the right along with the motion of conveyor pawls 95. The degree of left or right movement by a single conveyor pawl 95 in this instance is approximately equal to the pitch between it and the adjacent pawl, and by the combination of up-down and left-right movement of pawls 95, the connectors 2, 2', which are transferred between the plurality of pawls 95, are intermittently moved to the right.

Figure 6A:
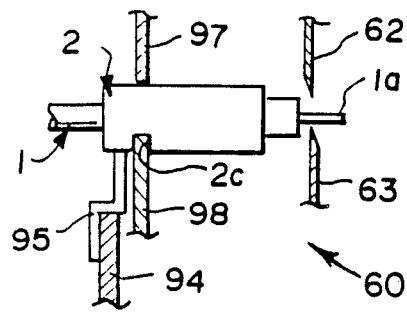
FIGS. 6A through 6C are part sectional views showing the core-cutting mechanism and core end surface-finishing mechanism of the machine.
Figure 6B:
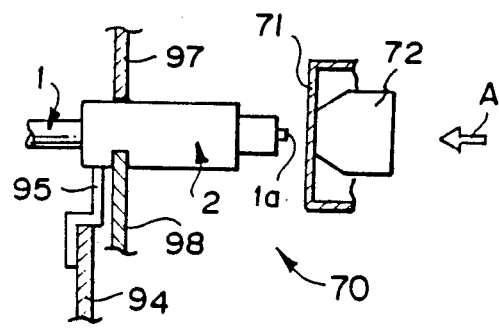

When the connectors 2, 2' are connected to cables 1 and moved by conveyor mechanism 90 arrive at a position opposite core-cutting mechanism 60, the projecting ends 1a of the fiber cores are cut off, leaving a tiny projecting length, as shown in FIG. 6B. This cutting operation is carried out by the pair of opposing blades 62, 63, which are positioned so as to be spaced from the rear of conveyor guide plates 97, 98. Blade 62 is lowered by blade cylinder 61 (see FIG. 1). When jacket 1b is stripped from cable 1 and fiber core 1a is exposed by stripping mechanism 10, it is possible to adjust the length of exposed fiber core 1a so that only a tiny length thereof is exposed, but constituents such as oil, etc. from the jacket can stick to the end surface of the fiber core 1a at the end of optical fiber cable 1 when the whole cable is cut, and the transparency of the end surface may be impaired if end surface finishing is done in this condition. If the fiber core 1a is cut after being exposed by this machine, there will be no adhesion of jacket constituents or oil to the fiber core end surface, and a favorable end surface finish can be obtained.

Figure 6C:
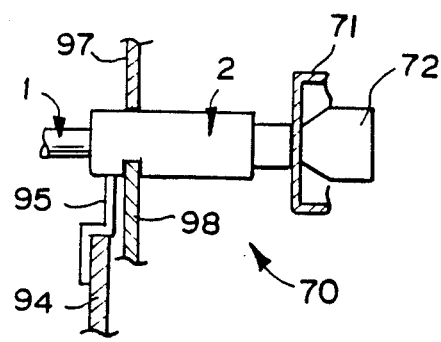
Figure 7D:
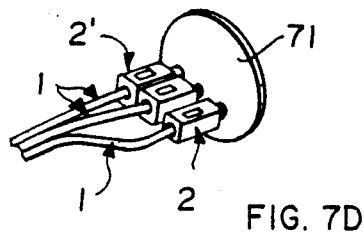
Figure 8:
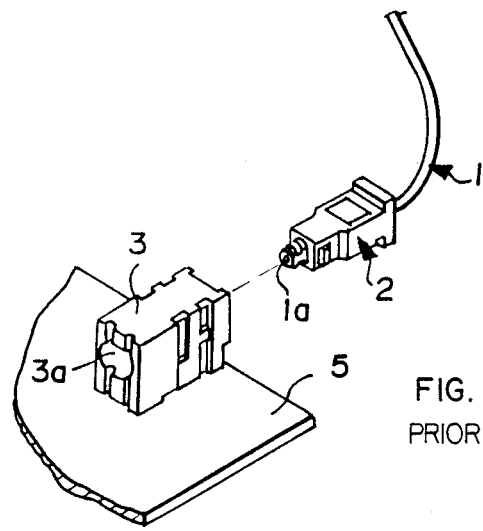
FIGS. 8 and 9 are perspective exploded views showing examples of the optical fiber cables connected to optical fiber connectors.
Figure 9:
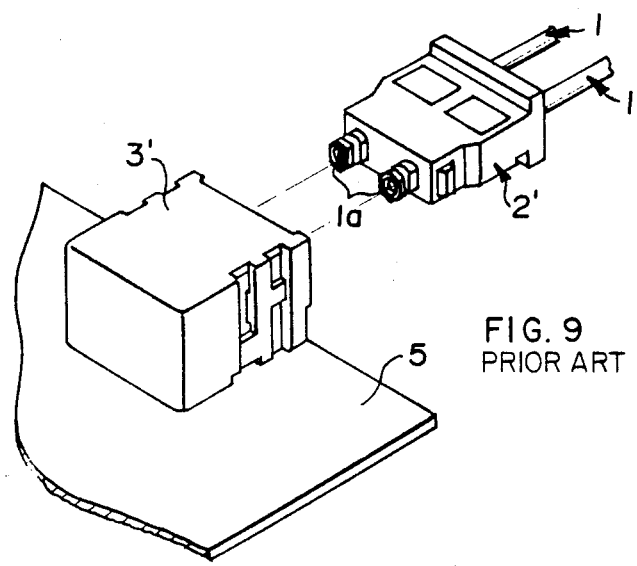

Connectors 2, 2' are now conveyed to a position facing core and surface-finishing mechanism 70. As shown in FIG. 6B, this core end surface-finishing mechanism 70 comprises a disk-shaped finishing plate 71 and a heater 72 connected to the rear surface of finishing plate 71. When connectors 2, 2' are moved to a position facing finishing plate 71, finishing plate 71 is moved forward in the direction of arrow A, and, as shown in FIGS. 6C and 7D, the finishing plate 71, heated by heater 72, engages the end surface of the small length of fiber core 1a which projects from the front end of connectors 2, 2', and this end surface is finished. After this, the optical fiber cable 1 connected at the end to connectors 2, 2' is moved by conveyor mechanism 90 and is ejected.

Examples have been described above wherein three cables are connected to a single cable connector and to a double cable connector, but the invention is not limited to these cases, and it also enables automatic and continuous manufacture of connection between one, two or more optical fiber cables and one, two or more optical fiber connectors.

As described above, this invention comprises a stripping mechanism which strips a jacket end off the end of an optical fiber cable and exposes a fiber core, a connector-connecting mechanism which inserts the stripped end of the cable into an insertion hole in an optical fiber connector and connects the cable with the connector, a core-cutting mechanism which cuts the fiber core protruding from the front end of the connector leaving a tiny length of protruding fiber core, and core end-finishing mechanism which finishes the end surface of the tiny length of protruding fiber core at the front end of the connector. It is therefore possible to automatically connect not only a single optical fiber connector to a single optical fiber cable, but also a plurality of optical fiber connectors to a plurality of optical fiber cables by the present invention.

We claim:

1. A machine for connecting an end of an optical fiber cable to an optical fiber connector, comprising:
   stripping means for stripping an end of a jacket from the end of the optical fiber cable to expose an end of a fiber core;
   connecting means for positioning the optical fiber cable and optical fiber connector so that the stripped end of the optical fiber cable can be positioned in a hole of a housing of the optical fiber connector, for inserting the stripped end of the optical fiber cable in the hole of the optical fiber connector housing with a length of the exposed end of the fiber core protruding slightly beyond a front end of the connector housing and for moving a retainer normal to the axis of the hole and into a securing position in the housing of the optical fiber connector thereby securing the end of the optical fiber cable in the optical fiber connector;
   cutting means for cutting off the length of fiber core that protrudes beyond the front end of the optical fiber connector leaving a tiny length of protruding fiber core; and
   surface-finishing means spaced from the cutting means for applying to the tiny length of protruding fiber core thereby finishing the end surface thereof.

2. A machine as claimed in claim 1, wherein said stripping means includes stripping blade means, means connected to said stripping blade means to move said stripping blade means into engagement with the end of the optical fiber cable and cut through the jacket, and means for moving the stripping blade means away from the end of the optical fiber cable thereby exposing the fiber core.

3. A machine as claimed in claim 2, wherein sensing means is provided adjacent said stripping blade means for sensing an end surface of the optical fiber cable and for operating said means for moving said stripping blade means.

4. A machine as claimed in claim 1, and further including first transfer means to transfer the stripped optical fiber cable to said connecting means.

5. A machine as claimed in claim 1, wherein said connecting means include clamp means for clamping the optical fiber cable in position so that the stripped end thereof is in position to be connected to the optical fiber connector, connector-receiving means for receiving the optical fiber connector and for moving the connector toward the stripped end of the optical fiber cable so that the stripped end of the cable is inserted into a hole in the connector housing with the length of fiber core protruding beyond the front end of the connector, and retainer driving means for driving the retainer into the connector housing thereby securing the end of the cable therein.

6. A machine as claimed in claim 1 and further including a second transfer and guide means for moving the connector and cable secured thereto to said cutting means, then to said surface-finishing means.

7. A machine as claimed in claim 1, wherein said cutting means include cutting blade means and operating means connected to said cutting blade means to operate same to cut off the length of protruding fiber core leaving a tiny length thereof.

8. A machine as claimed in claim 1, wherein said surface-finishing means includes plate means, heating means for heating said plate means, and operating means for moving said heated plate means against the end surface of the tiny length of protruding fiber core thereby finishing the end surface thereof.

* * * * *